US007737959B2

(12) United States Patent
Gruhlke et al.

(10) Patent No.: US 7,737,959 B2
(45) Date of Patent: Jun. 15, 2010

(54) POSITION DETECTION SYSTEM USING LASER SPECKLE

(75) Inventors: Russell W. Gruhlke, Fort Collins, CO (US); Rene P. Helbing, Palo Alto, CA (US); Susan Hunter, Fort Collins, CO (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 928 days.

(21) Appl. No.: 11/222,257

(22) Filed: Sep. 8, 2005

(65) Prior Publication Data

US 2007/0052684 A1 Mar. 8, 2007

(51) Int. Cl.
*G06F 3/042* (2006.01)
*G06F 3/041* (2006.01)
*G06K 11/06* (2006.01)
*G08C 21/00* (2006.01)

(52) U.S. Cl. ....................... 345/176; 345/173; 345/175; 178/18.01; 178/18.09

(58) Field of Classification Search ................. 345/156, 345/157, 173, 175, 176; 378/18.09, 18.11; 178/18.09, 18.11
See application file for complete search history.

(56) References Cited

U.S. PATENT DOCUMENTS 3,716,301 A 2/1973 Caulfield et al.
4,728,186 A * 3/1988 Eguchi et al. ................. 356/71
4,794,384 A 12/1988 Jackson
5,914,709 A * 6/1999 Graham et al. .............. 345/179
6,816,537 B2 * 11/2004 Liess .......................... 372/109
2002/0130841 A1 9/2002 Scott
2005/0243053 A1 11/2005 Liess
2007/0084989 A1 * 4/2007 Lange et al. ................ 250/221

FOREIGN PATENT DOCUMENTS

DE 3688339 4/1993
WO WO03102717 A2 * 12/2003

* cited by examiner

*Primary Examiner*—Sumati Lefkowitz
*Assistant Examiner*—Jonathan Horner

(57) ABSTRACT

A detection system. The detection system includes a substrate, a laser, and a sensor array. The substrate includes a first surface, a second surface conceptually divided into multiple areas, and a third surface. The laser is configured to emit electromagnetic radiation into the substrate and incident subsequently onto second surface areas. The sensor array is configured to capture electromagnetic radiation reflected from the second surface. If a first dielectric, having first dielectric constant, is in contact with some areas, electromagnetic radiation incident thereon experiences total internal reflection and if a second dielectric having second dielectric constant is in contact with other areas, some of the electromagnetic radiation incident thereon is reflected back into the substrate by the second dielectric. The sensor array is configured to detect laser speckle originating from the incidence of the electromagnetic radiation at the second surface and to detect electromagnetic radiation reflected from the second dielectric.

13 Claims, 4 Drawing Sheets

POSITION DETECTION SYSTEM USING LASER SPECKLE

BACKGROUND

A pointing device is a common component of a computer system by which an operator can control the computer using its graphical user interface (GUI). Various pointing devices have been developed over the years including joysticks, trackballs, mechanical mice, lightpens, and more recently optical mice for this purpose. In addition there are various types of digitizing tablets which typically employ a stylus.

The main goal of these pointing devices is to translate the motion of an operator's hand into signals that the computer can use. This is accomplished by displaying a cursor on the screen of the computer's monitor with the cursor moving in response to the user's hand movement. Commands that can be selected by the user are typically keyed to the location of the cursor. The desired command can be selected by first placing the cursor, via movement of the pointing device, at the appropriate location on the screen and then activating a button or switch on the pointing device.

Positional control of cursor placement on the monitor screen was initially obtained by mechanically detecting the relative movement of a joystick or a mouse with respect to a fixed frame of reference, which for a mouse could be the top surface of a desk or a mouse pad. A common technique is to use a ball inside the mouse which in operation touches the desktop or other surface and rolls when the mouse moves. Inside the mouse there are two rollers which touch the ball and roll as the ball rolls. One of the rollers is oriented so that it detects motion in a nominal X direction, and the other is oriented 90 degrees to the first roller so it detects motion in the associated Y direction. The rollers are connected to separate shafts, and each shaft is connected to a separate optical encoder which outputs an electrical signal corresponding to movement of its associated roller. This signal is appropriately encoded and sent typically as binary data to the computer which in turn decodes the signal it receives and moves the cursor on the computer screen by an amount corresponding to the physical movement of the mouse.

More recently, optical navigation techniques have been used to produce the motion signals that are indicative of relative movement along the directions of coordinate axes. These techniques have been used, for instance, in optical computer mice to replace conventional mice and trackballs, again for the position control of screen pointers in window user interfaces for computer systems. Such techniques have several advantages, among which are the lack of moving parts that accumulate dirt and that suffer from mechanical wear and tear.

Motion in a system using optical navigation techniques is measured by tracking the relative displacement of a series of images. First, a two dimensional view of an area of the reference surface is focused upon an array of photo detectors, whose outputs are digitized and stored as a reference image in a corresponding array of memory. A brief time later a second image is digitized. If there has been no motion, then the pattern of the image obtained subsequent to the reference image and the pattern of the reference image are essentially identical. If, on the other hand, there has been some motion, then the pattern of the subsequent image will have been shifted along the axis of motion with the magnitude of the shift of the pattern of the image corresponding to the magnitude of physical movement of the array of photosensors. The optical mouse used in place of the mechanical mouse for positional control in computer systems employs this technique.

In practice, the direction and magnitude of movement of the optical mouse can be measured by comparing the pattern of the reference image to a series of shifted versions of the pattern of the second image. The shifted image corresponding best to the actual motion of the optical mouse is determined by performing a cross-correlation between the reference image and each of the shifted second images with the correct shift most likely providing the largest correlation value. Subsequent images can be used to indicate subsequent movement of the optical mouse using the method just described. Optical navigation sensors operate by obtaining a series of images of an underlying illuminated surface texture. This surface has a micro texture.

Another recent device is the touchpad which was originally developed for use with laptop computers. Touchpads are sensitive to the touch of a user's finger. They permit a user to move a cursor on the computer screen merely by moving a fingertip across the surface of the touchpad. The presence of the user's finger is detected by an array of capacitive sensors arranged in a grid beneath the surface of the touchpad. Navigation of the cursor on the computer screen operates via capacitive coupling of the user's finger to the array of sensors. The user's finger slides over a sealed surface under which lie two layers of fine electrical conductors that are arranged in a grid and that create a surface electrical field. Touching the surface with a fingertip distorts the electrical field at that spot. The touching fingertip can be located by scanning the grid and sensing the strength of the distortion on each conductor. This technology, which is a form of capacitive-sensing, is referred to as field distortion sensing. Direction of the On Screen mouse or cursor is directly effected by movement of a person's fingertip on surface of the touchpad. Supporting software allows for customizing the acceleration of the mouse and for assigning mouse "click" and "drag-lock" functions as well. The size of such touchpads varies depending on manufacturer and model. Some are as small as a 2 inch by 2 inch square.

SUMMARY

In representative embodiments, a detection system is disclosed. The detection system comprises a substrate, a laser, and a sensor array. The substrate comprises a first surface, a second surface conceptually divided into multiple areas, and a third surface. The laser is configured to emit electromagnetic radiation into the substrate and incident subsequently onto second surface areas. The sensor array is configured to capture electromagnetic radiation reflected from the second surface. If a first dielectric, having first dielectric constant, is in contact with some areas, electromagnetic radiation incident thereon experiences total internal reflection and if a second dielectric having second dielectric constant is in contact with other areas, some of the electromagnetic radiation incident thereon is reflected back into the substrate by the second dielectric. The sensor array is configured to detect laser speckle originating from the incidence of the electromagnetic radiation at the second surface and to detect electromagnetic radiation reflected from the second dielectric.

In another representative embodiment, a method is disclosed. The method comprises illuminating a surface with a laser, placing an item at a first location on the surface, capturing a first pattern reflected from the illuminated surface by a sensor array, storing the captured first pattern in a data storage device, moving the item to a second location on the surface, capturing a second pattern reflected from the illuminated surface by the sensor array, and computing the positional change of the item from the first location by comparing the captured first pattern to the captured second pattern.

Other aspects and advantages of the representative embodiments presented herein will become apparent from the following detailed description taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand them and their inherent advantages. In these drawings, like reference numerals identify corresponding elements.

DETAILED DESCRIPTION

Figure 1A:
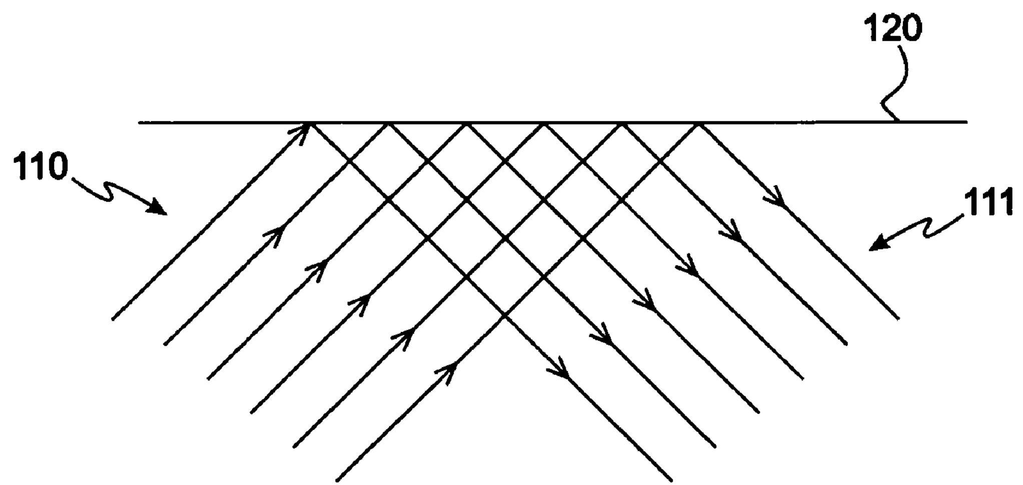
FIG. 1A is a drawing of laser illumination incident upon a smooth, reflecting surface.

As shown in the drawings for purposes of illustration, representative embodiments of a novel position detection system are disclosed herein. Various navigation devices such as joysticks, trackballs, mechanical mice, lightpens, optical mice, and digitizing tablets have been used to drive a cursor on the screen of a computer. However, in miniature, electronic commercial products such as cell phones, mechanical rocker switches constitute the current navigation technology. The selection of a particular, pre-programmed electronic function is accomplished by pressing one side of a circular disk. This technology is simple and cost effective. But, its selection flexibility is limited to the four possible discrete rocker positions (up/down and left/right) which is often coupled with a miniature display. In representative embodiments, a more sophisticated navigation scheme is disclosed in which the detection of laser speckle is combined with the movement of a finger to drive cursor motion on a miniature display in a manner similar to that of a computer mouse.

In the following detailed description and in the several figures of the drawings, like elements are identified with like reference numerals.

FIG. 1A is a drawing of laser illumination 110 incident upon a smooth, reflecting surface 120. Light 110 from a laser is coherent, or in phase, and remains so when reflected, as in FIG. 1A, from a perfectly smooth, reflecting surface. The resultant wave following reflection from the smooth surface 120 is shown as reflected laser light 111.

Figure 1B:
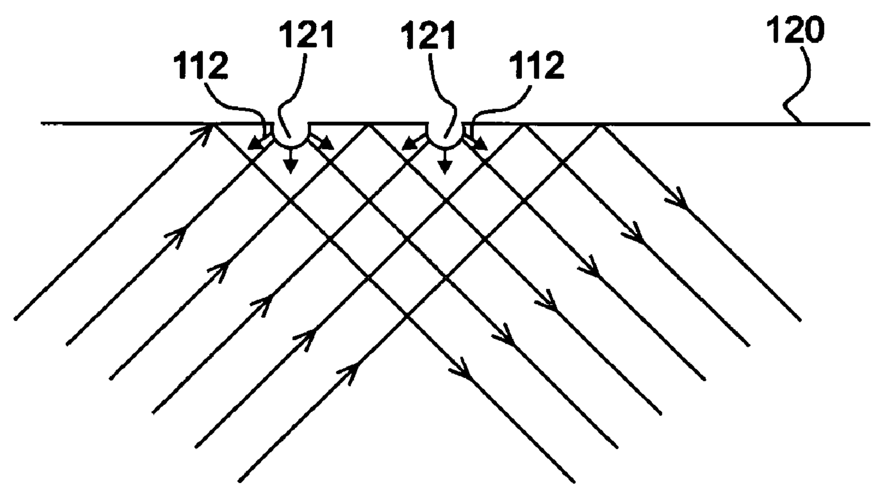
FIG. 1B is a drawing of laser illumination incident upon a microscopically rough, reflecting surface resulting in speckle.

FIG. 1B is a drawing of laser illumination 110 incident upon a microscopically rough, reflecting surface 120 resulting in speckle. When laser light 110 is incident, however, upon a microscopically rough surface 120, as in FIG. 1B, a portion of the incident laser light 110 is scattered from the microscopic imperfections 121, producing a pattern of light and dark "speckles" which can be detected by a sensor array. This scattering is shown in FIG. 1B as scattered light 112, also referred to herein as the speckle light 112.

Figure 2:
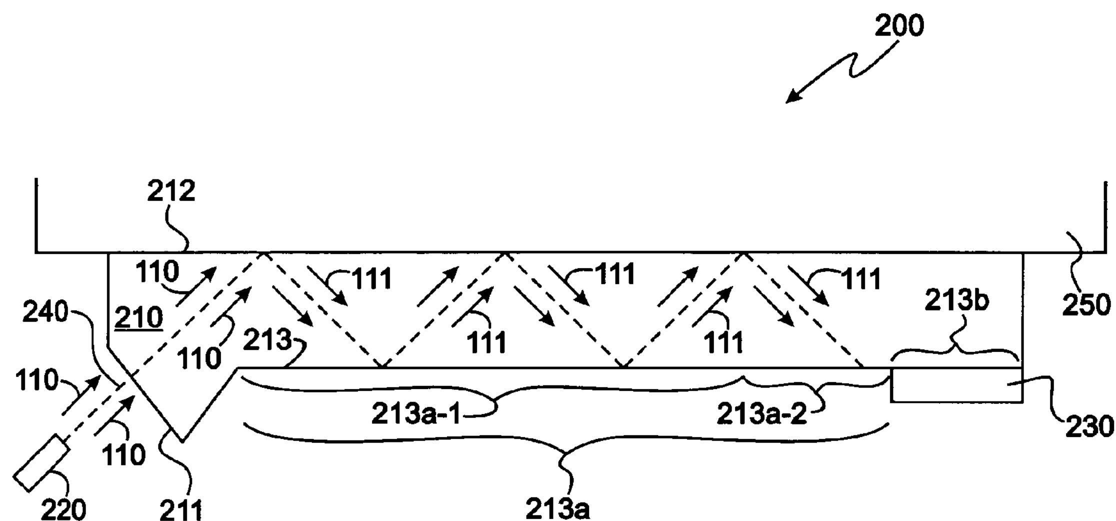
FIG. 2 is a drawing of a detection system as described in various representative embodiments.

FIG. 2 is a drawing of a detection system 200 as described in various representative embodiments. As shown in FIG. 2, the detection system 200 comprises a substrate 210, a laser 220 and a sensor array 230. The substrate 210 comprises a first surface 211, a second surface 212 and a third surface 213. The laser 220 is configured to emit light 110, or more generally electromagnetic radiation 110, into the substrate 210 via the first surface 211 with subsequent incidence onto the second surface 212. The light 110 from the laser 220 is emitted as a collimated beam and follows path 240 into and through the substrate 210 when a first dielectric 250 having a first dielectric constant is in contact with the second surface 212. In such case, the dielectric constant of the substrate 210 and the angle of incidence of the light 110 onto the second surface 212 are such that the light 110 experiences total internal reflection such that essentially none of the light 110 escapes into the first dielectric 250. The first dielectric 250 could be, for example, air or other appropriate material. For total internal reflection to occur the dielectric constant of the substrate 210 must be greater than the dielectric constant of the first dielectric 250.

Once the light 110 is reflected from the second surface 212 the light travels to the third surface 213. The third surface 213 comprises a first section 213*a* and a second section 213*b*. The first section 213*a* is mirrored such that any of the reflected light 111 incident thereon from the second surface 212 is reflected once again back into the substrate 210. The sensor array 230 is configured to receive the light 110 incident on the second section 213*b* of the third surface 213. Typically, however, the detection system 200 will be designed such that in the absence of speckle and with the first dielectric 250 in contact with the second surface 212, the beam of light 110 from the laser 220 will not be incident upon the second section 213*b* of the third section 213. However, microscopic imperfections 121 in the second surface 212, as well as microscopic imperfections 121 in the first section 213*a* of the third surface 213, will result in the reception of some of light 110 onto the sensor array 230. Thus, the sensor array 230 is configured to detect laser speckle originating from the incidence of the light 110 at the second surface 212, as well as any laser speckle originating from the incidences/reflections of the light 110 at the second section 213*a* and subsequent incidences/reflections at the second surface 212.

Further, the first section 213*a* of the third surface 213 may comprise a first and a second sub-sections 213*a*-1, 213*a*-2. The first subsection 213*a*-1 could be mirrored and the second sub-section 213*a*-2 could be otherwise. As an example, the second sub-section 213*a*-2 could be covered or coated with a black or other material either partly or completely absorbent of the light 110 in order to reduce extraneous light 110 incident on the sensor array 230 thereby making the sensor array 230 more sensitive to the scattered light 110 of the speckle. The second sub-section 213*a*-2 could also be transparent allowing the light 110 to exit the substrate 210. Note that the part of the light 110 from the laser 220 which is not scattered by speckle contains no useful information and if allowed to be collected by the sensor array 230 may make detection of the scattered light 110 difficult.

For ease of illustration, the microscopic imperfections 121 in the second surface 212, the microscopic imperfections 121 in the first section 213*a* of the third surface 213 and the resultant scattered light 112 are not shown in FIG. 2.

Figure 3:
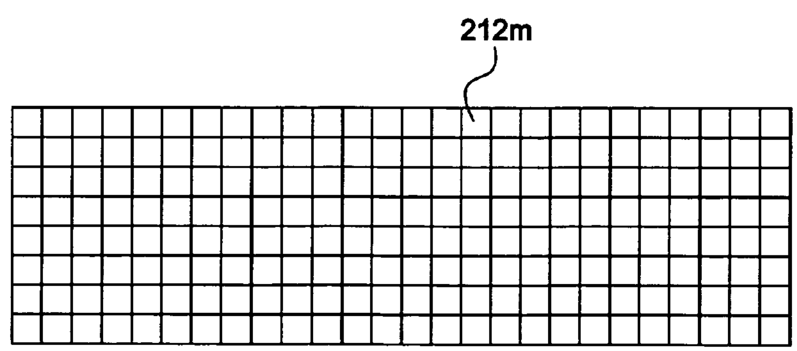
FIG. 3 is a drawing of a view of a second surface at an angle normal to that surface as described in various representative embodiments.

FIG. 3 is a drawing of a view of the second surface 212 at an angle normal to that surface 212 as described in various representative embodiments. In FIG. 3, the second surface 212 is shown conceptually divided into multiple areas 212*m*, only one of which is identified as such for ease of illustration. It is emphasized that the multiple small areas 212*m* are conceptual only and are used only for ease of description.

Figure 4:
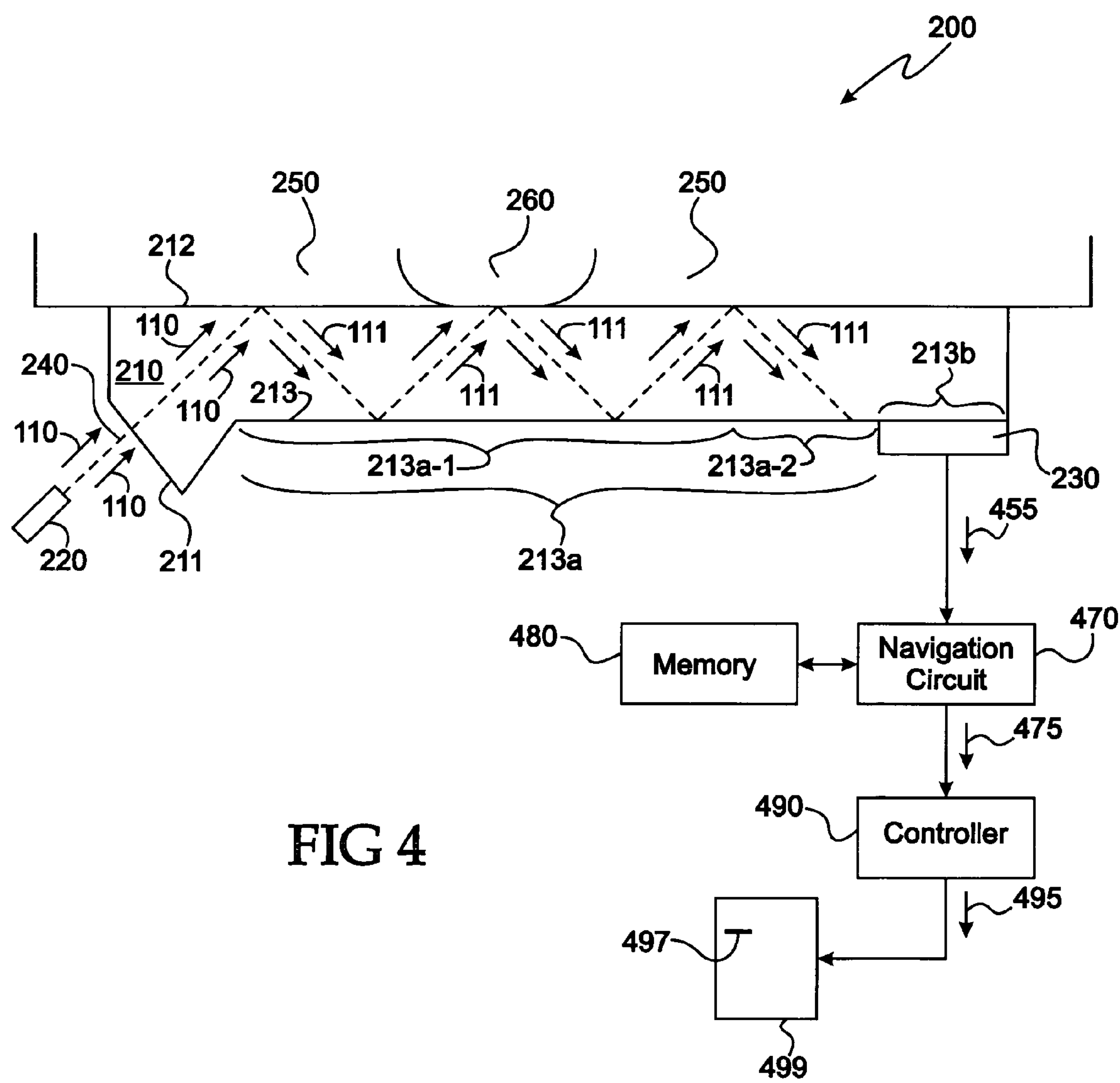
FIG. 4 is another drawing of the detection system as described in various representative embodiments.

FIG. 4 is another drawing of the detection system 200 as described in various representative embodiments. In FIG. 4, a second dielectric 260, which could be a finger, a ridge of a finger, or other appropriate material is in contact with a part of the second surface 212. In particular, the second dielectric 260 is in contact with one or more of the multiple areas 212*m* of the second surface 212 while the first dielectric 250 is in contact with remaining areas 212*m* of the second surface 212. The second dielectric 260 has a second dielectric constant which is sufficiently greater than that of the first dielectric constant such that total internal reflection does not occur at those areas 212*m* of the second surface 212 at which the second dielectric 260 is in contact. Results of laser light 110 incident upon the second surface 212 in those areas 212*m* in which the first dielectric 250 is in contact will be the same as described for FIG. 2. However, for those areas on which the second dielectric 260 is in contact, the reflected light 111 will be modified dependent upon speckle added by the second dielectric 260 and the reflective characteristics of the second dielectric 260. Thus, the light pattern received by the sensor array 230 with the presence of the second dielectric 260 at one or more locations on the second surface 212 will be modified from that received without the presence of the second dielectric 260.

Prior to its complete journey through the substrate 210, the light 110 may be incident onto and reflected from the second surface 212 one or more times. This reflected light 111 may then be reflected from the third surface 213 one or more times or may not be reflected at all at the third surface 213. Typically, the second surface 212 will be parallel to the third surface 213 acting as a waveguide to direct the light 110 down the length of the substrate toward the end at which the sensor array 230 is located. Also typically, the light 110 will experience several reflections at both the second and the third surfaces 212,213.

Further, the first section 213*a* of the third surface 213 may comprise a first and a second sub-sections 213*a*-1, 213*a*-2. The first subsection 213*a*-1 could be mirrored and the second sub-section 213*a*-2 could be otherwise. As an example, the second sub-section 213*a*-2 could be covered or coated with a black or other material either partly or completely absorbent of the light 110 in order to reduce extraneous light 110 incident on the sensor array 230 thereby making the sensor array 230 more sensitive to the scattered light 110 of the speckle. The second sub-section 213*a*-2 could also be transparent allowing the light 110 to exit the substrate 210. Note that the part of the light 110 from the laser 220 which is not scattered by speckle and which is not reflected by the second dielectric 260 contains no useful information and if allowed to be collected by the sensor array 230 may make detection of the scattered light 110 difficult.

For ease of illustration, the microscopic imperfections 121 in the second surface 212, the microscopic imperfections 121 in the first section 213*a* of the third surface 213 and the resultant scattered light 112 are not shown in FIG. 4.

The sensor array 230 is preferably a complementary metal-oxide semiconductor (CMOS) sensor array. However, other imaging devices such as a charge coupled-device (CCD), photo diode array or photo transistor array may also be used. The laser 220 shown in FIGS. 2 and 4 is preferably a vertical-cavity surface-emitting laser (VCSEL) 220 but could be another type of laser 220. The laser 220 could also be replaced by another light source, as for example, a light emitting diode (LED) or the like. However, a laser 220 would provide better resolution of the speckle.

The detection system 200 shown in FIG. 4 further comprises a navigation circuit 470 which collects signals 455 from the sensor array 230. The collected signals 455 may then be stored into a data storage device 480, which could be a memory 480. The detection system 200 may also comprise a controller 490.

In operation, by using the sensor array 230 to capture successive exposures, relative movement between the second dielectric 260 and the second surface 212 can be detected. With the second dielectric 260 in a first location, a resulting first pattern is captured and transferred to the navigation circuit 470 which then typically stores it in the memory 480. Subsequent movement of the second dielectric 260 with respect to the second surface 212 to a second location results in a second pattern which differs from the first pattern due to the different location of the second dielectric 260. The relative movement of the second dielectric 260 can be computed by the navigation circuit 470 by comparing the first and second patterns.

The sensor array 230 captures patterns at a rate determined by the application and which may vary from time to time. The captured patterns are representative of the various areas 212*m* of the second surface 212 as modified by the presence and location of the second dielectric 260. This positional information is transferred to the controller 490 as positional signal 475. The controller 490 subsequently generates an output signal 495 that can be used to position a cursor 497 or other indicator 497 on a screen 499.

The navigation circuit 470 and/or the memory 480 can be configured as an integral part of navigation circuit 470 or separate from it. Further, navigation circuit 470 can be implemented as, for example, but not limited to, a dedicated digital signal processor, an application specific integrated circuit, or a combination of logic gates.

Figure 5:
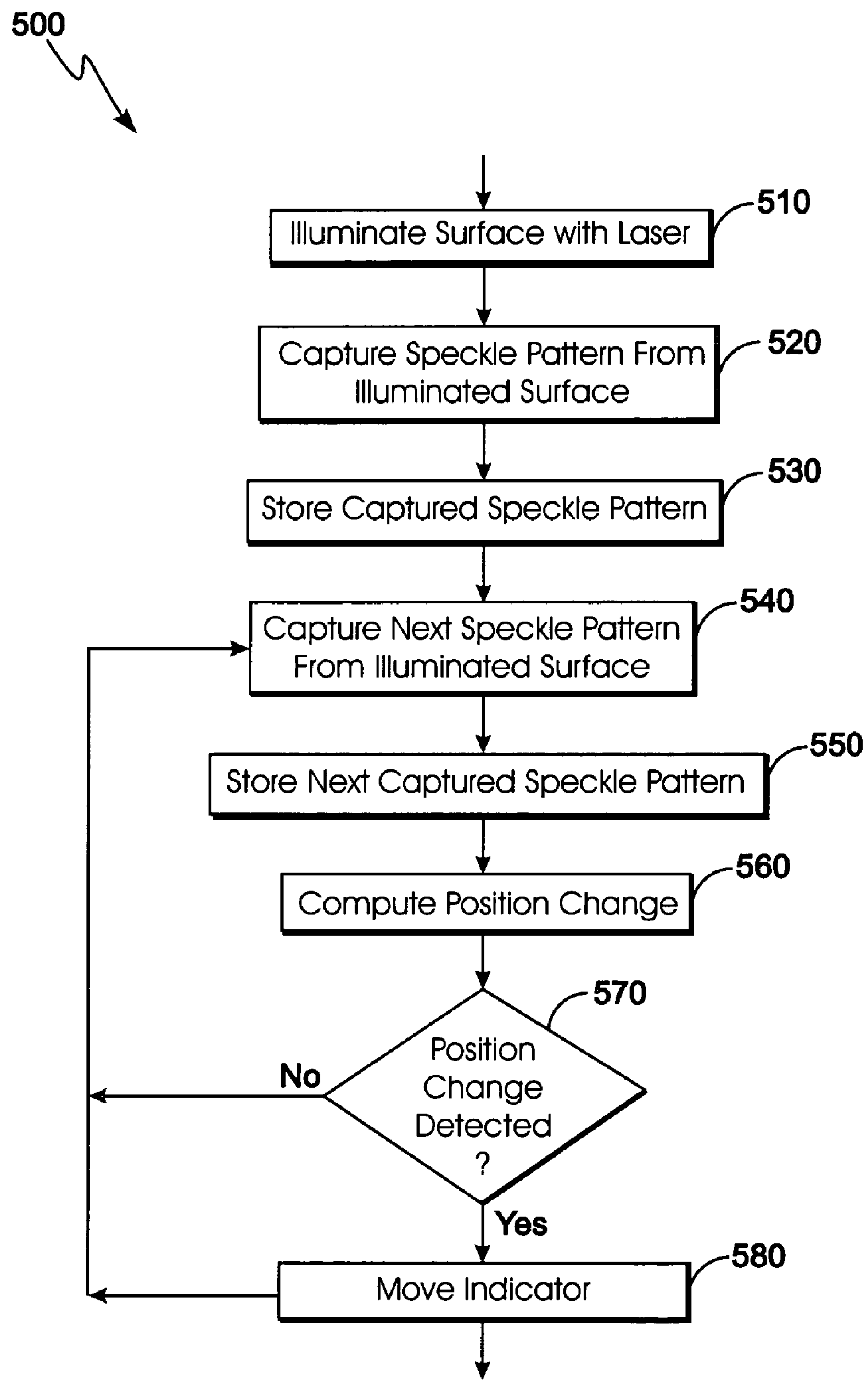
FIG. 5 is a flowchart of a method for determining positional change using laser speckle as described in various representative embodiments.

FIG. 5 is a flowchart of a method 500 for determining positional change using laser speckle as described in various representative embodiments. In block 510, a surface 212 is illuminated with light 110 from a laser 220. Block 510 then transfers control to block 520.

In block 520 a pattern comprising speckle, also referred to herein as a speckle pattern, which is scattered from the illuminated surface 212 is captured by the sensor array 230. Block 520 then transfers control to block 530.

In block 530 the captured speckle pattern is stored in a memory 480. Block 530 then transfers control to block 540.

In block 540 the next speckle pattern which is scattered from the illuminated surface 212 is captured by the sensor array 230. Block 540 then transfers control to block 550.

In block 550 the next captured speckle pattern is stored in a memory 480. Block 550 then transfers control to block 560.

In block 560 two captured speckle patterns are compared to determine what positional change of an item 260 (second dielectric 260) that might have been placed on the surface 212 was detected. Block 560 then transfers control to block 570.

In block 570, if a positional change is detected, block 570 transfers control to block 580. Otherwise, block 570 transfers control to block 540.

In block 580 a move indicator 497, as for example a cursor 497 on a screen 499, is moved in response to the computed positional change. Block 580 then transfers control to block 540.

In summary, a system which uses laser speckle for positional determination and navigation has been disclosed. In representative embodiments, the teachings disclosed herein can be used to provide compact, low cost systems that can use the movement of a finger on a surface for such purposes. The detection process makes use of the optical phenomenon known as laser speckle wherein light from a focused laser is scattered by a microscopically rough surface with the resultant reflected light producing a pattern of light and dark speckles.

Laser light is emitted from a source, coupled into a waveguide and detected by, for example, a silicon sensor. Movement of a finger on top of the surface of the waveguide changes the light pattern on the sensor. This change can be detected by a sensor array. The waveguide structure has several advantages. First, it reduces eye safety concerns related to the laser output. Total internal reflection keeps the laser light inside the waveguide (and the module) until a finger touches it. Then the laser light only reflects off of the finger without leaking external to the waveguide. In addition, using the waveguide structure increases the optical path length through the system. Optical length determines the speckle size and, therefore, pixel size on the sensor array. Typically larger speckle size is preferred to allow larger pixel sizes on the sensor, which increases sensitivity. The waveguide structure permits an increase of optical length without an increase in height of the module, which is typically at a premium in small, mobile applications.

Speckle navigation is based on coherent light interference technology and therefore typically needs a laser source. The emitted light is coupled into the waveguide by a prism structure. This structure can be integrated into the waveguide as shown in FIG. 2 and FIG. 4, e.g. by injection molding of a plastic part or may be separate from it. The emitted light is then guided through the structure and coupled out with at least part of the light being captured by the sensor. To assist this coupling, the sensor can be attached to the waveguide without an air gap, e.g. by means of optical adhesive. If no finger, or other item, is present or if the finger is stationary, the sensor will detect a stationary speckle pattern. If the finger moves, the speckle pattern on the sensor moves. This speckle pattern change can be detected with the sensor. Detection of speckle movement can be carried out by comparing two or more captured patterns.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A detection system, comprising:

a substrate comprising a first surface, a second surface conceptually divided into multiple areas, and a third surface having first and second sections;

a laser configured to emit electromagnetic radiation into the substrate via the first surface with subsequent incidence onto some areas of the second surface; and a sensor array configured to capture electromagnetic radiation reflected from the second surface and incident on the second section, wherein if a first dielectric having first dielectric constant is in contact with some areas, electromagnetic radiation incident thereon experiences total internal reflection and if a second dielectric having second dielectric constant is in contact with other areas, some of the electromagnetic radiation incident thereon is reflected back into the substrate by the second dielectric, wherein at least part of the first section is configured to reflect electromagnetic radiation incident thereon, and wherein the sensor array is configured to detect laser speckle originating from the incidence of the electromagnetic radiation at the second surface and to detect electromagnetic radiation reflected from the second dielectric, wherein the substrate is configured such that at least some of the electromagnetic radiation travels at least from the first surface directly to the second surface, then from the second surface directly to the third surface, and then from the third surface directly to the second surface before being captured at the sensor array, and wherein the substrate is configured such that the electromagnetic radiation that experiences the total reflection due to the first dielectric does not reach the second section of the third surface, the sensor array being positioned to receive only the electromagnetic radiation incident on the second section of the third surface, and wherein a first subsection of the first section of the third surface is a mirrored surface and a second subsection of the first section of the third surface is covered with a light absorbing material, the second subsection being positioned between the first subsection and the second section of the third surface.

2. The detection system as recited in claim 1, wherein, except for scattering due to speckle, if the first dielectric is in contact with one or more of the areas, the electromagnetic radiation incident thereon is not collected by the sensor array.

3. The detection system as recited in claim 1, wherein the laser is a vertical-cavity surface-emitting laser.

4. The detection system as recited in claim 1, wherein the first dielectric is selected from the group consisting of finger tissue and air.

5. The detection system as recited in claim 1, wherein the second dielectric is selected from the group consisting of finger tissue and air.

6. The detection system as recited in claim 1, wherein the substrate acts as a waveguide for the electromagnetic radiation from the laser.

7. The detection system as recited in claim 1, wherein the second surface is substantially parallel to the third surface.

8. The detection system as recited in claim 1, wherein the second dielectric comprises at least one ridge of a finger.

9. The detection system as recited in claim 1, further comprising:

a data storage device; and a navigation circuit, wherein the navigation circuit is configured to collect signals from the sensor array, store the collected signals in the data storage device, and to compute relative movement of the second dielectric with respect to the second surface by comparing collected signals from different points in time.

10. The detection system as recited in claim 9, further comprising:

a controller, wherein the positional information is transferred from the navigation circuit to the controller as positional signal and wherein the controller subsequently generates an output signal that can be used to position a cursor on a screen.

11. A method, comprising:

emitting light from a laser into a first surface of a substrate;

transmitting the light from the first surface to second and third surfaces of the substrate within the substrate such that at least some of the light travels from the first surface directly to the second surface, then from the second surface directly to a first section of the third surface, and then from the third surface directly to the second surface to produce a speckle pattern reflected from the second surface at a second section of the third surface, including totally reflecting some of the light between the second and third surfaces so that totally reflected light does not reach the second section of the third surface;

capturing the speckle pattern reflected from the second surface at the second section of the third surface by a sensor array, the sensor array being positioned to receive only the light incident on the second section of the third surface so that the totally reflected light is not captured by the second array;

storing the captured speckle pattern in a data storage device;

capturing a next speckle pattern reflected from the second surface by the sensor array; and computing positional change by comparing at least two captured speckle patterns, wherein the transmitting includes reflecting some of the light at a first subsection of the first section of the third surface and absorbing some of the light at a second subsection of the first section of the third surface, the first subsection being a mirrored surface, the second subsection being covered with a light absorbing material, the second subsection being positioned between the first subsection and the second section of the third surface.

12. The method as recited in claim 11, further comprising:

if a positional change did occur, moving a cursor on a screen in response to the computed positional change; and repeating the above steps beginning with the capturing a next speckle pattern.

13. The method as recited in claim 11, wherein the speckle patterns comprise speckle from an item placed in contact with the second surface.

* * * * *